June 10, 1947.  E. D. GLATZ  2,421,783
POSITION INDICATOR FOR AIRCRAFT IN FLIGHT
Filed March 19, 1945  2 Sheets-Sheet 1
FIG. 1.
FIG. 4.
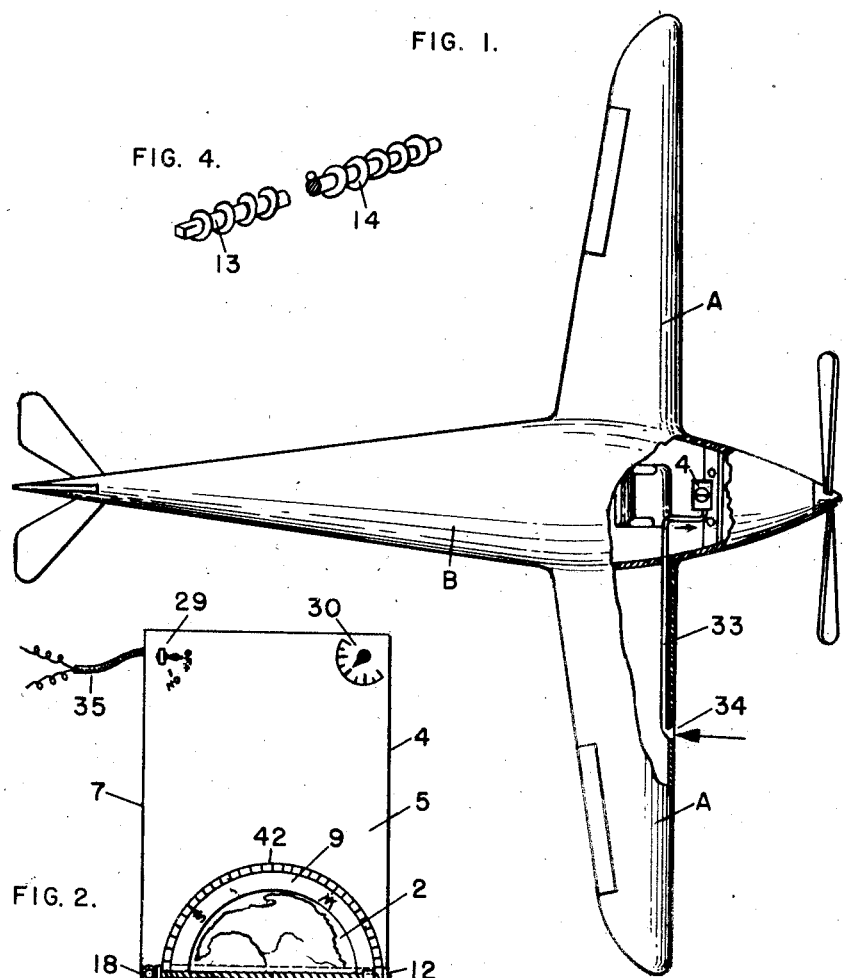
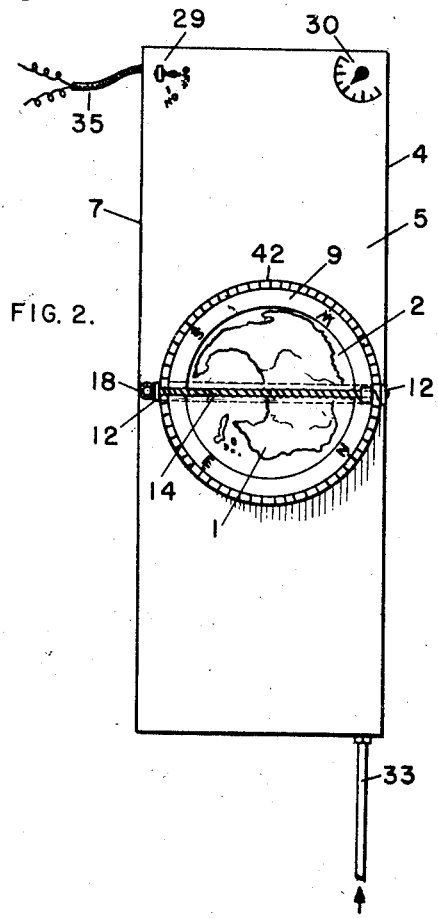
FIG. 2.
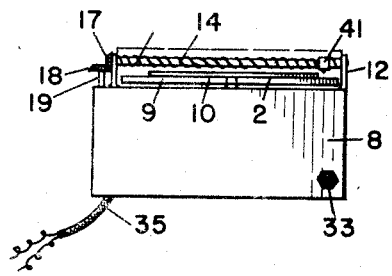
FIG. 3.
INVENTOR.
EDWARD D. GLATZ
BY
*Victor J. Evans & Co.*
ATTORNEYS June 10, 1947.   E. D. GLATZ   2,421,783
POSITION INDICATOR FOR AIRCRAFT IN FLIGHT
Filed March 19, 1945   2 Sheets-Sheet 2

INVENTOR.
EDWARD D. GLATZ
BY
Victor J. Evans & Co.
ATTORNEYS

Patented June 10, 1947

2,421,783

UNITED STATES PATENT OFFICE 2,421,783

POSITION INDICATOR FOR AIRCRAFT
IN FLIGHT

Edward D. Glatz, Kenmore, N. Y.

Application March 19, 1945, Serial No. 583,407

4 Claims. (Cl. 73—178)

My present invention, in its broad aspect, has to do with improvements in course indicators as an aid to navigation of aircraft and the like, and more particularly, it is my purpose to provide a simple, accurate, and effective course indicator regulated by air pressure at the leading edge of an airplane wing, and reflected in the speed of a motor-driven indicator in relation to a map on which the course is laid, through the medium of a rheostat control.

My invention contemplates dividing up a map of the world into circles—these may be nine inch circles—so that for all areas of the world there is a circle. An aircraft operating in the part of the world covered by one of the circles, and anticipating flying a course involving areas covered by several circular portions of the map would determine from a master map the circles he would need to cover his course. My device includes an air pressure diaphragm responsive to fluctuating air pressures at the leading edge of a wing, and associated with an air pressure controlled rheostat to regulate the speed of a motor driving an indicator. A map circle is placed beneath the indicator, adjustments made for drift, head winds, tail winds and the like, and position with reference to points of the compass, and the movement of the indicator over the map is responsive to and indicative of the progress of the aircraft as determined by fluctuations in air pressure which will give a simple and accurate reading of the position of the aircraft at any point in its journey.

Among the important objects and advantages of my invention are: (1) to provide a very simple and easily readable position and course indicator which will automatically show the progress and position of the airplane at any stage in its flight or journey; (2) to provide simple and effective means for controlling the speed of a motor actuating mechanism in accordance with air pressure; (3) to provide a novel and practical medium of mapping any course for the purposes of the instrument; (4) to provide a simple and effective indicator; and to provide a sturdy and desirable device which may be used to advantage on any aircraft now in use.

Other and equally important objects and advantages of my invention will be apparent from the foregoing description taken in connection with the accompanying drawings, but it is to be understood that changes in form, size, shape, arrangement, construction and disposition of parts may be made without departing from my broad inventive concept or what is claimed.

In the drawings wherein I have illustrated a preferred form of my invention:

Figure 1 is a top plan view of a conventional airplane with the wing structure and fuselage broken away to show my invention installed;

Figure 2 is a front view of my instrument showing the map, the indicator, the air inlet and electric conductor;

Figure 3 is an end view of my instrument;

Figure 4 is a perspective view of the worm drive for my indicator;

In the drawings wherein like characters of reference are used to designate like or similar parts throughout the several views:

Figure 9:
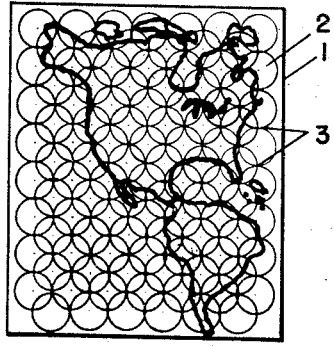
Figure 9 is a view showing how a map is divided up into circular areas.
Figure 8:
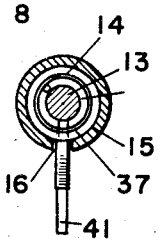
Figure 8 is a transverse section on the line 8—8 of Figure 6.

The numeral 1 indicates a large navigational map, which for the purposes of my invention is divided into interlocking circles 2. These are preferably nine inch circles since I have found this size convenient, and it will be noted that all areas of the map are represented by portions shown in at least one circle. These circles may be numbered or identified in some manner for handy reference. A master map with the respective circles outlined and identified (such as is shown in Figure 9) is used, and from the master map, the separate circular portions covering the route of a journey are selected. It will be noted that the circles intersect at the quarters as at 3.

I provide a rectangular housing 4 having a top 5, bottom 6, sides 7 and ends 8. Mounted on a disc 9 on the top 5 is any desired circular portion 2 of the map 1—as shown in Figure 2—and the disc is retained by a pin 10 on a bracket 11 beneath the top for adjustment. The map may be held in any suitable manner on the disc and is selected to show the area covered by the journey or a portion of the journey and is oriented as to the points of the compass, in making initial adjustments; it may also be adjusted to compensate for wind currents and the like.

Figure 5:
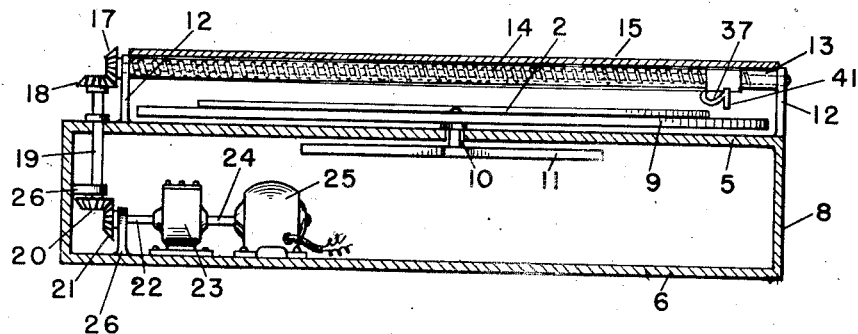
Figure 5 is a transverse section through my instrument.

On either side of the disc 9 adjacent the sides of the housing are standards 12 carrying a shaft 13 which extends diametrically across the disc and is spaced therefrom as shown in Figure 5. A worm 14 is formed on the shaft, and I have found that this can be satisfactorily accomplished by turning a wire about the shaft, and a cylindrical transparent cover 15 is provided for the worm and is attached at its ends to standards 12. The cover has a slot 16 from end to end in its under side. The shaft 13 carries a bevel gear 17 which meshes with a bevel gear 18 on the vertical shaft 19 leading into the housing and having a bevel gear 20 at its lower end meshing with a bevel gear 21 on a drive shaft 22 to a reduction gear box 23 connected by a shaft 24 with the motor 25. The vertical shaft 19 and drive shaft 22 are carried by bearings 26. By these means, the worm is driven from motor 25 through reduction gears in box 23.

Figure 7:
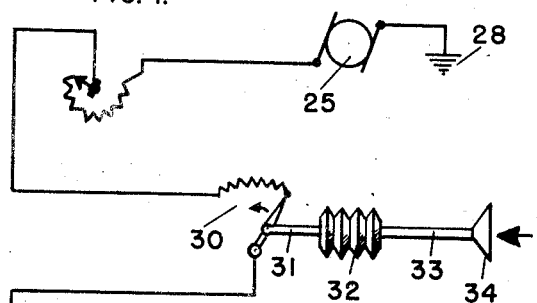
Figure 7 is a wiring diagram of my instrument coupled with a showing of the air pressure diaphragm and an inlet.

The circuit to the motor (see Figure 7) includes a battery 27, grounds 28, a switch 29, and there is interpolated in the circuit a rheostat 30 connected by an arm 31 to an air pressure diaphragm 32. These elements may be carried in the housing 4. Leading into the housing is a tube 33 having a pressure mouth 34 at the leading edge of the wing A of the aircraft B. Wire connections 35 lead into the housing and connect to the motor 25. By these means, the rheostat 30 is regulated by air pressure at the leading edge of the wing through diaphragm 32 and arm 31, and the rheostat in turn regulates the speed of motor 25 and worm 14.

Figure 6:
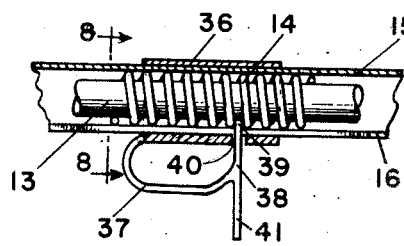
Figure 6 is a sectional detail of the indicator drive.

A sleeve 36 is slidably carried on the cylindrical cover 15 of the worm and has a curved extension 37 carrying an indicator arm 38, which extends at right angles to the sleeve 36—see Figure 6—and has one end 39 extending through an opening 40 in the sleeve to engage the worm 14 through the slot 16 and function as a traveler. The other end 41 of the arm is the indicating arm and follows across the map to indicate the course and position of the aircraft. The reduction gears in box 23 may be regulated to regulate the worm to move the indicator at fractions of an inch to miles of travel—say 1 inch to 100 miles of travel, such travel being indicated by air pressure on the diaphragm and consequent motor speed.

On the periphery of disc 9 are graduations indicating the points of the compass—as at 42—and these are used to orient the map section 2 when it is placed in position on the disc.

In operation, the navigator of an aircraft would consult his master map and ascertain what circular parts 2 cover the territory to be traversed on the journey. The first of these circular parts is then placed on the disc 9 and oriented as to compass bearings; adjustments are then made for wind and the like, and the indicator placed on the starting point. When the aircraft rises, the switch 29 is closed and the air pressure created by the moving plane on diaphragm 32 affects rheostat 30 to regulate the speed of motor 25 and worm 14 to conform to that of the movement of the aircraft. By gear reduction, the indicator is caused to move a certain distance in relation to the miles covered by the aircraft so that the indicator follows the route on the circular part of the map (and other discs necessary to cover the territory of the journey), and the navigator can at all times ascertain his position.

It is believed that the operation, advantages, and construction of my invention will be apparent from the foregoing, but it is again emphasized that interpretation of its scope should only be conclusive when made in the light of the subjoined claims.

I claim:

1. An instrument for indicating the position of an aircraft in transit, comprising a section of a map covering the territory to be covered, an indicator movably mounted over said map, a motor operatively connected with said indicator to drive the same, and in circuit with a source of current supply, a rheostat interpolated in the circuit, and an air pressure responsive device connected with the rheostat to adjust the speed of the motor to the air pressure created by the aircraft in transit whereby the indicator is caused to move across the map to indicate the position of the aircraft.

2. An instrument for indicating the position of an aircraft in transit, comprising a section of a map covering the territory to be covered, an indicator movably mounted over said map and including a rotatable worm and a traveler connected with the indicator and following the worm, a motor operatively connected with said worm to drive the same, and in circuit with a source of current supply, a rheostat interpolated in the circuit, an air pressure diaphragm responsive to pressures created by the aircraft in transit and connected with the rheostat to adjust the speed of the motor to the speed of the aircraft to cause said indicator to move in accordance with distance traveled, and a reduction gear device interpolated in the connection between the motor and worm.

3. The invention as described in claim 2 wherein the traveler includes a tubular cover for the worm provided with a slot, a sleeve, mounted on said cover, an indicating arm on the sleeve and having an extension passing through the slot in the cover and engaging the worm, and a disc beneath the indicator on which the map is mounted, and disc being adjustable.

4. The invention as defined in claim 1, wherein a disc is provided to mount the map, said disc being provided with graduations corresponding to those of a compass and means for adjustably mounting the map to the direction of the path of travel of the aircraft.

EDWARD D. GLATZ.

REFERENCES CITED

The following references are of record in the file of this patent:

UNITED STATES PATENTS

| Number | Name | Date |
|---|---|---|
| 1,968,539 | Rydberg | July 31, 1934 |
| 2,095,084 | Rylander | Oct. 5, 1937 |
| 2,169,532 | Jensen | Aug. 15, 1939 |
| 2,178,422 | Heagney | Oct. 31, 1939 |

FOREIGN PATENTS

| Number | Country | Date |
|---|---|---|
| 313,221 | Great Britain | June 13, 1934 |